(12) United States Patent
Raskar et al.

(10) Patent No.: US 9,378,041 B2
(45) Date of Patent: Jun. 28, 2016

(54) METHOD AND SYSTEM FOR INTEGRATING AND IMPLEMENTING VIRTUAL SERVICE PACKAGES ACROSS DIFFERENT SERVICE VIRTUALIZATION TOOLS

(71) Applicant: Cognizant Technology Solutions India Pvt. Ltd., Chennai, TN (US)

(72) Inventors: Hemant Raskar, Pune (IN); Amit Dhongde, Pune (IN)

(73) Assignee: COGNIZANT TECHNOLOGY SOLUTIONS INDIA PVT. LTD. (IN)

( * ) Notice: Subject to any disclaimer, the term of this patent is extended or adjusted under 35 U.S.C. 154(b) by 52 days.

(21) Appl. No.: 14/481,385

(22) Filed: Sep. 9, 2014

(65) Prior Publication Data

US 2016/0011897 A1 Jan. 14, 2016

(30) Foreign Application Priority Data

Jul. 8, 2014 (IN) .............................. 3377/CHE/2014

(51) Int. Cl.
*G06F 9/455* (2006.01)
*G06F 17/30* (2006.01)

(52) U.S. Cl.
CPC ............ *G06F 9/45558* (2013.01); *G06F 9/455* (2013.01); *G06F 17/30864* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,261,295 | B1* | 9/2012 | Risbood | G06F 9/44505 717/177 |
| 2004/0167867 | A1* | 8/2004 | Owen | G06F 17/30873 |
| 2008/0301674 | A1* | 12/2008 | Faus | G06F 9/45558 718/1 |
| 2010/0049628 | A1 | 2/2010 | Mannava et al. | |
| 2010/0162264 | A1 | 6/2010 | Allen et al. | |
| 2011/0296021 | A1 | 12/2011 | Dorai et al. | |
| 2012/0131573 | A1* | 5/2012 | Dasari | G06F 9/45558 718/1 |
| 2013/0174034 | A1* | 7/2013 | Brown | G06F 17/30976 715/708 |
| 2014/0130047 | A1* | 5/2014 | Wang | G06F 9/45533 718/1 |

(Continued)

OTHER PUBLICATIONS

Groesbrink, Stefan, et al., "Towards Certifiable Adaptive Reservations for Hypervisor-based Virtualization", 2014, pp. 13-24.*

(Continued)

*Primary Examiner* — Thuy Dao
*Assistant Examiner* — Christopher Franco
(74) *Attorney, Agent, or Firm* — Cantor Colburn LLP

(57) ABSTRACT

A method and system for integrating and implementing virtual service packages across different service virtualization tools is provided. Data is generated for performing a search on multiple virtual service package interfaces based on request received from a service virtualization tool. Virtual service package interfaces are fetched based on the search using the generated data. Each of the fetched virtual service package interfaces is assigned a selection priority value and a weight value. Further, an execution criticality value is computed for the fetched virtual service package interfaces based on the selection priority value and the weight value. Furthermore, a virtual service package interface with highest execution criticality value is selected. The selected virtual service package interface is invoked for execution. Finally, a response generated based on the execution is sent to the service virtualization tool. The selected virtual service package interface is integratable and implementable across different service virtualization tools.

20 Claims, 5 Drawing Sheets

(56) References Cited

U.S. PATENT DOCUMENTS

2014/0280918 A1* 9/2014 Grandhe ............. G06F 9/45558
 709/224
2014/0365662 A1* 12/2014 Dave ................... G06F 9/45533
 709/226

OTHER PUBLICATIONS

Yau, Stephen S., et al., "Software Engineering Meets Services and Cloud Computer", 2011, pp. 47-53.*
Rubio-Loyola, Javier, et al., "Scalable Service Deployment on Software-Defined Networks", 2011, pp. 84-93.*
Shea, Ryan, et al., "Network Interface Virtualization: Challenges and Solutions", 2012, pp. 28-34.*
Vu, Lan, et al., "GPU Virtualization for High Performance General Purpose Computing on the ESX Hypervisor", 2014, pp. 1-8.*
Regola, Nathan, et al., "Recommendations for Virtualization Technologies in High Performance Computing", 2010, pp. 409-416.*
Parasoft/Service Virtualization for Mobile Application Testing, http://www.parasoft.com/service-virtualization/mobile-testing; Date of online retrieval: Sep. 9, 2014.

* cited by examiner

METHOD AND SYSTEM FOR INTEGRATING AND IMPLEMENTING VIRTUAL SERVICE PACKAGES ACROSS DIFFERENT SERVICE VIRTUALIZATION TOOLS

CROSS REFERENCE TO RELATED APPLICATION

This application is related to and claims the benefit of Indian Patent Application No. 3377/CHE/2014 filed on 8 Jul. 2014, the contents of which are incorporated by reference in their entirety.

FIELD OF THE INVENTION

The present invention relates generally to the field of service virtualization of real application services for carrying out various operations. More particularly, the present invention relates to a method and system for identifying, integrating and implementing virtual service packages across different service virtualization tools.

BACKGROUND OF THE INVENTION

Nowadays, service virtualization technology is widely used for development and testing of applications (such as service oriented architecture based applications) across various service based enterprise industries. Service virtualization is a method of developing virtual application services (virtual services or virtual service packages) by emulating behavior, data and performance of real application services of various enterprise systems. Using virtual services, developers and testers (also referred as user) can proceed with developing and testing without accessing actual components of the real application services.

Conventionally, various software virtualization tools are available which perform service virtualization using various scripting languages such as Java script, .Net script, European Computer Manufacturers Association (ECMA) script etc. or using Application Programming Interface (API) based capability.

The support for abovementioned scripting languages is in-built in the software virtualization tools and is specific to each tool. Typically, in order to mimic accurate behavior of real application service components, service virtualization involves writing complex business logic for a virtual service package into a software virtualization tool using scripting mechanism specific to that tool for generating service responses.

There are, however, several drawbacks associated with the conventional in-built support provided by the software virtualization tools. Once business logic corresponding to the virtual service package is built into the software virtualization tool, the virtual service package cannot be reused with other software virtualization tools as each software virtualization tool has a specific scripting and execution mechanism. Further, various software virtualization tools specific constraints act as a deterrent for reusability of the virtual service package. For using the virtual service package with the other software virtualization tools, the virtual service package needs to be migrated to other software virtualization tools, which entails huge computational overhead, cost and time. Yet further, scripting support provided in the software virtualization tools is not capable of delivering expected performance, execution patterns, program-control over service behavior and handling anticipated changes in the virtual service packages in view of business dynamics.

Furthermore, during application testing or application development activities using virtual service packages via the software virtualization tool, recorded responses or generated responses are provided back to querying clients. For instance, the responses are generated by users of the software virtualization tools by manipulating data using different data-sets, business rules or conditions and service behavior using respective in-built scripting mechanisms. Using such ad-hoc generated or recorded responses may not achieve the desired testing or development results.

Furthermore, conventional methods for integrating external virtual service packages with a software virtualization tool are via scripting, which again will be different for different tools. As such, once the external virtual service packages are built using a specific software virtualization tool, it cannot be reused with other software tools. In order to integrate or offer the same virtual service package with other software virtualization tools, the same business logic needs to be completely rewritten as per the software virtualization tools' standards. This involves extensive redesigning, development and maintenance overheads to comply with business dynamics and to satisfy business requirements.

In light of the above drawbacks, there is a need for a method and system to provide virtual service packages that are reusable across all service virtualization tools. There is a need for a service virtualization mechanism that is independent of service virtualization tool specific methodologies. Also, there is a need for integration and execution of virtual service packages with adequate reusability, and yet satisfying all performance and business requirements of virtual service packages. Additionally, there is a need for a service virtualization mechanism via which external virtual service packages are identified, invoked as well as executed, despite the external virtual service package developer's lack of knowledge of service virtualization tools used by the service virtualization mechanism.

SUMMARY OF THE INVENTION

A computer-implemented method for integrating and implementing virtual service packages across different service virtualization tools via program instructions stored in a memory and executed by a processor is provided. In an embodiment of the present invention, the method comprises generating, via the processor, data for performing a search on multiple virtual service package interfaces based on a request from a service virtualization tool. The multiple virtual service package interfaces correspond to multiple virtual service packages. Further, the method comprises fetching, via the processor, one or more virtual service package interfaces based on the search performed on the multiple virtual service package interfaces using the generated data. Each of the fetched virtual service package interfaces is assigned a selection priority value and a weight value. The method further comprises computing, via the processor, an execution criticality value for each of the fetched virtual service package interfaces based on the selection priority value and the weight value assigned to each of the fetched virtual service package interfaces. Furthermore, the method comprises selecting, via the processor, a virtual service package interface with highest execution criticality value. The method further comprises invoking, via the processor, the selected virtual service package interface for executing the selected virtual service package interface. Furthermore, the method comprises sending, via the processor, a response generated based on execution of the selected virtual service package interface to the service virtualization tool. In various embodiments of the present invention, the selected virtual service package interface is integratable and implementable across different service virtualization tools.

A system for integrating and implementing virtual service packages across different service virtualization tools is provided. In an embodiment of the present invention, the system comprises a virtual isomorph engine in communication with a processor and configured to host multiple virtual service package interfaces. The system further comprises a router search engine in communication with the processor and configured to generate data for performing a search on multiple virtual service package interfaces based on a request received from a service virtualization tool. The multiple virtual service package interfaces correspond to multiple external virtual service packages. The router search engine is further configured to fetch one or more virtual service package interfaces based on a search performed on the multiple virtual service package interfaces using the generated data. Further, the router search engine is configured to assign to each of the fetched virtual service package interfaces a selection priority value and a weight value. Furthermore, the router search engine is configured to compute an execution criticality value for each of the fetched virtual service package interfaces based on the selection priority value and the weight value assigned to each of the fetched virtual service package interfaces. The router search engine is further configured to select a virtual service package interface with highest execution criticality value. Further, the router search engine is configured to invoke the selected virtual service package interface stored in the virtual isomorph engine for executing the selected virtual service package interface. Finally, the router search engine is configured to send a response generated based on execution of the selected virtual service package interface to the service virtualization tool. In various embodiments of the present invention, the selected virtual service package interface is integratable and implementable across different service virtualization tools.

A computer program product is provided. In an embodiment of the present invention, the computer program product comprises a non-transitory computer-readable medium having computer-readable program code stored thereon, the computer-readable program code comprising instructions that, when executed by a processor, cause the processor to generate data for performing a search on multiple virtual service package interfaces based on a request received from a service virtualization tool. The multiple virtual service package interfaces correspond to multiple external virtual service packages. The computer program product is further configured to fetch one or more virtual service package interfaces based on the search performed on the multiple virtual service package interfaces using the generated data. Each of the fetched virtual service package interfaces is assigned a selection priority value and a weight value. Further, the computer program product is configured to compute an execution criticality value for each of the fetched virtual service package interfaces based on the selection priority criteria and the weight value assigned to each of the fetched virtual service package interfaces. Furthermore, the computer program product is configured to select a virtual service package interface with highest execution criticality value and is further configured to invoke the selected virtual service package interface for executing the selected virtual service package interface. Furthermore, the computer program product is configured to send a response generated based on execution of the selected virtual service package interface to the service virtualization tool. The selected virtual service package interface is integratable and implementable across different service virtualization tools.

BRIEF DESCRIPTION OF THE DRAWINGS

The present invention is described by way of embodiments illustrated in the accompanying drawings wherein.

DETAILED DESCRIPTION OF THE DRAWINGS

A system and method for integration and implementation of virtual service packages across different service virtualization tools is provided. The invention provides for a service virtualization tool independent mechanism for identification, integration and execution of virtual service package interfaces pertaining to multiple external (or dependent/unavailable) application service components of various enterprise systems. The invention facilitates generating service responses using external virtual service packages in a most effective and optimal manner for application testing or application development activities.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in the context of embodiments as illustrated in the accompanying drawings.

Figure 1:
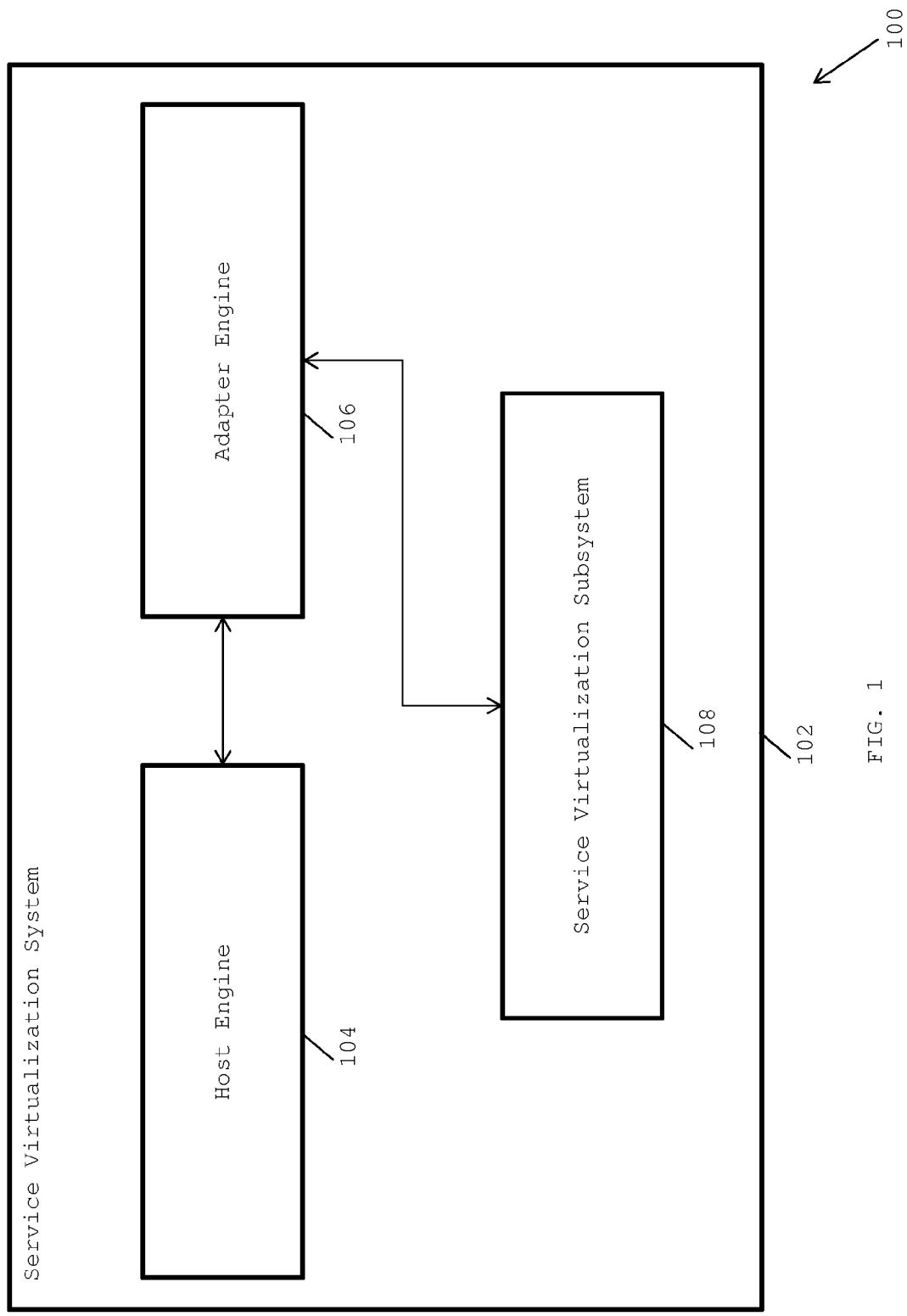
FIG. 1 illustrates a block diagram of a service virtualization system for identifying, integrating and executing virtual service packages across different service virtualization tools, in accordance with an embodiment of the present invention.

FIG. 1 is a block diagram of a service virtualization system 102 for identifying, integrating and executing virtual service packages across different service virtualization tools, in accordance with various embodiments of the present invention. The service virtualization system 102 comprises a host engine 104, an adapter engine 106 and a service virtualization subsystem 108. The service virtualization system 102 operates in communication with a processor (not shown) configured to execute program instructions stored in a memory (not shown) for implementing functionalities of the host engine 104, the adapter engine 106 and the service virtualization subsystem 108. In an embodiment of the present invention, the service virtualization subsystem 108 provides for a reusable framework which can be used with any standard service virtualization tool without any modifications needed in the virtual service packages during integration of external virtual service packages or implementation of the virtual service packages. As discussed above, the virtual service packages provide end-to-end industry specific functionalities by emulating behavior of the industry specific real application services during testing or application development operations.

In an embodiment of the present invention, the host engine 104, the adapter engine 106 and the service virtualization subsystem 108 are deployed in an adapter-framework architecture. The host engine 104 forms the base side of the architecture and the adapter engine 106 as well as the service virtualization subsystem 108 forms the adapter and framework side of the architecture, respectively. In this embodiment, the host engine 104 is an entity for hosting virtual application services. Any standard service virtualization tool may be hosted as the host engine 104. Users of the service virtualization tool i.e. the host engine 104, access the service virtualization subsystem 108 via the adapter engine 106. The service virtualization subsystem 108 is configured to provide required information pertaining to virtual service package interfaces that correspond to multiple virtual service packages. The virtual service packages correspond to software application packages of various industries. The service virtualization system 102 facilitates implementing the virtual service packages of a particular industry, and further facilitates integrating services of other industries that are external to that particular industry using the virtual service packages of the other industries. Irrespective of the type of service virtualization tool, any virtual service package from the multiple virtual service packages can be integrated and implemented without any service virtualization tool specific scripting requirement, according to the teachings of the present invention. The details are discussed in the later sections of the specification.

In an embodiment of the present invention, the host engine 104 is configured to accept multiple requests for identifying an appropriate virtual package interface in the service virtualization subsystem 108. In an exemplary embodiment of the present invention, the request may be a Hypertext Transfer Protocol (HTTP)-based web service request. The request may include a web service interface name and information related to a business scenario for implementing a virtual service package that corresponds to the requested web service. In an example, the web service interface name may correspond to interfaces of external web services viz. ecommerce application web services such as ebay, financial service web services such as banking web service, credit card payment and processing, insurance claim centers etc. In another exemplary embodiment of the present invention, the request may be a Transmission Control Protocol/Internet Protocol (TCP/IP)-based request for a messaging service. Further, the business scenario may implement specific requirements for unit test scenario or a system test performance scenario. In an exemplary embodiment of the present invention, the request may include an Extensible Markup Language (XML) request message with header content and payload content that includes schema definition of the payload content as well as interface moniker object that provides information for identifying the requested virtual service package interface. After receiving the request message, the host engine 104 validates the request based on the header content and the schema-definition. The host engine 104 then directly invokes the adapter engine 106 by sending the XML request message. In another exemplary embodiment of the present invention, the host engine 104 invokes the adapter engine 106 using template based scripting. Template based scripts are out-of-box java script(s) written specifically for a given service virtualization tool so that the user is required to fill minimal data in the template-scripts for invoking the adapter engine 106. In yet another exemplary embodiment of the present invention, the host engine 104 invokes the adapter engine 106 using a legacy script. Legacy scripts may be used for invoking the adapter engine 106 in the event the service virtualization tools do not support java scripts but instead support other legacy or tool-specific scripts.

In an embodiment of the present invention, the adapter engine 106 is an entity that retrieves the payload content part as well as the interface moniker from the request message received from the host engine 104 for transmission to the service virtualization subsystem 108. In this embodiment of the present invention, the adapter engine 106 acts as a communication gateway between the host engine 106 and the service virtualization subsystem 108. In an embodiment of the present invention, the service virtualization subsystem 108 is an entity that hosts various engines to route the received message, identify an appropriate virtual service package interface, and send the response message at the identified virtual service package interface back to the adapter engine 106.

In particular, in an embodiment of the present invention, the service virtualization subsystem 108 is configured to analyze the interface moniker present in the request message and determine an appropriate virtual service package interface from the multiple available virtual service package interfaces. The determination of an appropriate virtual service package interface is made based on the scenario in which the virtual service package is implemented. The different implementations scenarios may include, but is not limited to, a unit test scenario, and a system test performance scenario. In an exemplary embodiment of the present invention, the service virtualization subsystem 108 determines the most prioritized virtual service package interface on the basis of one or more priority criteria that is set based on the implementation scenario of requested virtual service packages. The details are provided in later sections of the specification.

In various embodiments of the present invention, the adapter engine 106 is configured to register and unregister components of the virtual service packages as well as the virtual service package interfaces. Further, the adapter engine 106 is configured to create a repository of details related to the virtual service packages and virtual service package interfaces.

Furthermore, the adapter engine 106 is configured to send the response message from the determined virtual service package interface using the service virtualization subsystem 108 to the host engine 104. The adapter engine 108 sends the response message to the host engine 104 either synchronously or asynchronously (i.e. when the host engine 104 places a demand for the virtual service package interface). The details are provided in later sections of the specification.

Figure 2:
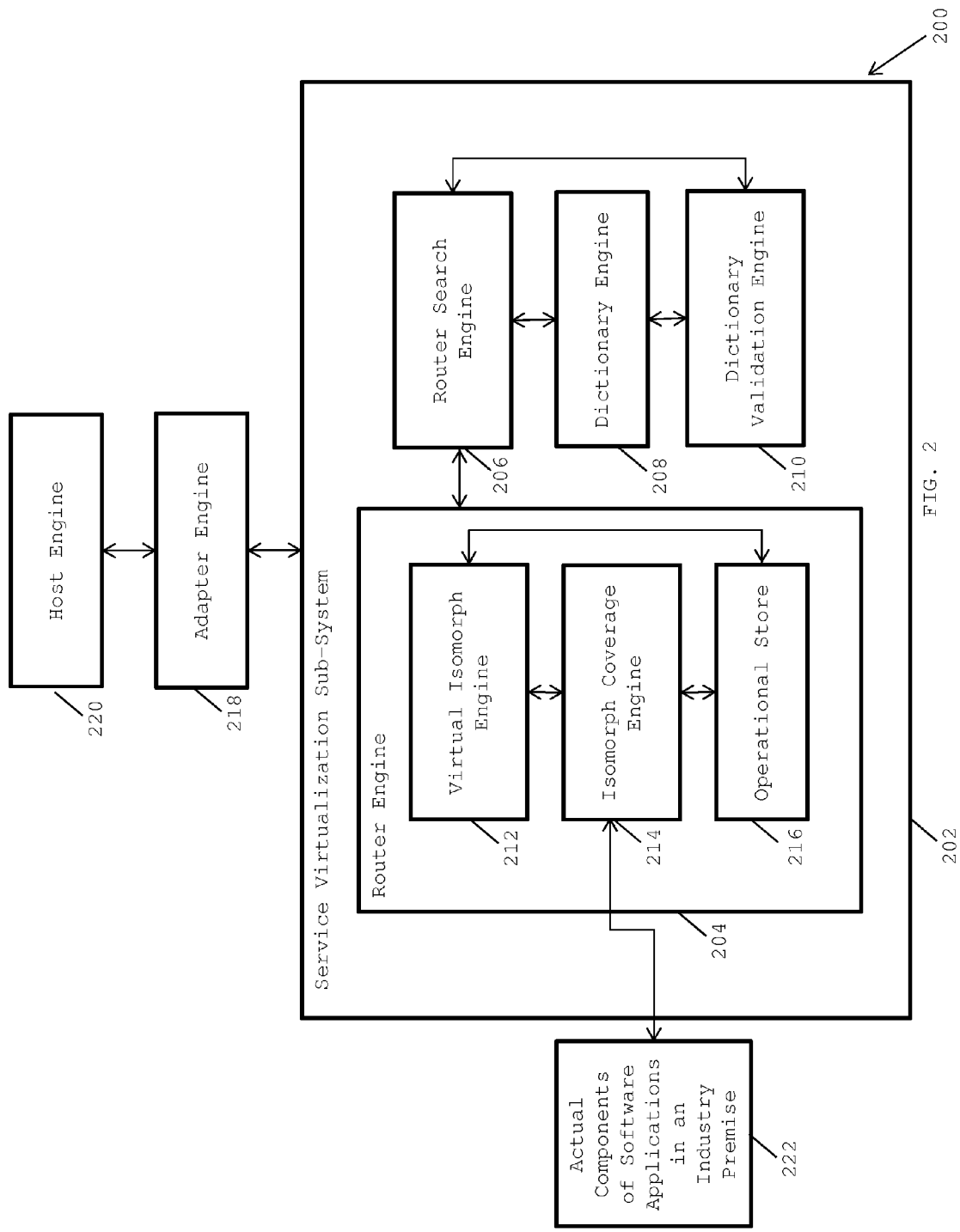
FIG. 2 illustrates a detailed block diagram of a service virtualization subsystem, in accordance with an embodiment of the present invention.

FIG. 2 illustrates a detailed block diagram of a service virtualization subsystem 202, in accordance with an embodiment of the present invention. The service virtualization subsystem 202 comprises one or more engines viz. a router engine 204, a router search engine 206, a dictionary engine 208, and a dictionary validation engine 210. The router engine 204 further comprises a virtual isomorph engine 212, an isomorph coverage engine 214 and an operational store engine 216. The service virtualization system 202 operates in communication with a processor (not shown) configured to execute program instructions stored in a memory (not shown) for implementing functionalities of the abovementioned engines.

In an embodiment of the present invention, the router engine 204 in the service virtualization subsystem 202 is configured to receive the request message from the adapter engine 218. The router engine 204 obtains an appropriate virtual service package interface based on the web service interface name in the request message for different implementations scenarios such as a unit test scenario, a system test performance scenario etc. The router engine 204 operates in communication with the router search engine 206, the dictionary engine 208, and the dictionary validation engine 210 for obtaining the appropriate virtual service package interface. The details related to determination of an appropriate virtual service package interface are explained in later sections of the specification.

The virtual isomorph engine 212 in the router engine 204 is an entity that includes interfaces corresponding to multiple virtual service packages. In an exemplary embodiment of the present invention, the virtual isomorph engine 212 is an in-memory entity. In an example, the virtual service package interfaces may be implemented in Java based programming language. The virtual service package interfaces are class-member functions exposed by respective external virtual service packages which mimic the real application service component behavior. The virtual service package interfaces are responsible for generating appropriate response for the received request. The isomorph-coverage engine 214 in the router engine 204 maintains the data structures corresponding to the multiple virtual service package interfaces in the virtual isomorph engine 212. In an exemplary embodiment of the present invention, the isomorph coverage engine 214 is an in-memory entity. Further, the isomorph-coverage engine 214 is configured to assign an identification name to each of the virtual service package interface. Additionally, the isomorph-coverage engine 214 is configured to update the data structures of the multiple virtual service packages by communicating with the actual executing components of applications 222 corresponding to the virtual service package interfaces. It would be understood by a person of skill in the art that the actual executing applications 222 are present at the industry premises.

In an embodiment of the present invention, the dictionary engine 208 is an entity that maintains a list of all the virtual service package interfaces that are available in the virtual isomorph engine 212. The dictionary engine 208 further maintains information related to one or more attributes related to the virtual service packages including, but not limited to, names of the virtual service packages, classification information for each of the virtual service packages, and identification names of virtual service package interfaces of the virtual service package interfaces. Further, the dictionary engine 208 also maintains information related to other attributes such as execution delay for each of the virtual package service interfaces, if any, and intra-mapping of these attributes with each other so that access to the virtual package interfaces is seamless with minimum data-processing requirement at run-time. The dictionary validation engine 210 is an entity configured to prevent faults in the process of identifying an appropriate virtual service package interface corresponding to the received request. The dictionary validation engine 210 validates the information contained in the dictionary engine 208 against the available virtual service package interfaces in the virtual isomorph engine 212 in order to ensure that the incorrect virtual service package interfaces are not invoked.

In operation, in an embodiment of the present invention, the router engine 204 routes the request message to the router search engine 206. The router search engine 206 is an entity that selects an appropriate virtual service package interface from the multiple interfaces available in the virtual isomorph engine 212 based on the received request.

In an exemplary embodiment of the present invention, the router search engine 206 analyzes the request message to obtain the requested web service interface name and the information related to the implementation scenario of the virtual service package that corresponds to the requested web service. As discussed previously, the implementation scenario may include a unit test scenario or a system test performance scenario for the virtual service package. Based on the analysis, the router search engine 206 generates one or more virtual interface search data in communication with the dictionary engine 208. The virtual interface search data includes one or more interface parameter data and one or more configuration properties related to the virtual service package interface. The one or more interface parameter data includes, but is not limited to, list of virtual service package names corresponding to the request message, classification information for each of the virtual service packages, list of identification names of the virtual service package interfaces, and list of number of interfaces available for the requested virtual service package. Further, the router search engine 206 generates one or more configuration properties for searching the most prioritized virtual service package interface in the dictionary engine 208. In one example, the configuration properties include one or more priority values for selecting an appropriate virtual service package interface from amongst multiple interfaces listed in the dictionary engine 208. The priority values may be configured by the user from time to time based on changing scenarios for implementing the virtual service package. In another example, the configuration properties may include one or more weight values that are assigned to virtual service package interfaces searched in the dictionary engine 208 for the requested virtual service package. The one or more weight values are used to adjust the priority values of the virtual service package interfaces with same identification names, which in turn facilitate the process of selecting a virtual service package interface. In an exemplary embodiment of the present invention, the weight values are non-negative integer values.

An exemplary pseudo-code for obtaining virtual service package interfaces based on virtual interface search data is provided hereunder:

Step-1:
a. List pack—names . . . i.e. names of the virtual service packages $$PN(Pname)=\{P1, P2, P3, P4, \ldots Pp\}$$

where, p is total number of packages
b. List of class—names far given packages . . . i.e. classification information of the virtual service packages $$CN(Cnames)[i]=\{C1, C2, \ldots, Cc\}$$

where, c is total number of classes in packages i and i $\in$ [1, 2, . . . p]
c. For each class j, where j$\in$[1, 2, . . . , c]

$$C(j)=\{sp. FN\}$$

where sp is selection priority of the class j
FN set of functions available for class j . . . i.e.

identification names of the virtual service package interfaces
d. FN is set of functions for given class j . . . i.e. number of
interfaces available for the requested virtual service package $$FN(j)=\{F1, F2, F3, F4 \ldots Fn\}$$

where, n is total number of functions for class j $$F(k)=(fname, wt)$$

where, k $\in$ [1, 2, . . . , n]
fname is name of the function and
wt is weight assigned to function k
Step-2: For each function F(k), get the execution criticality as $$EC(k)=wt(k)*sp(j)$$

As illustrated by the exemplary pseudo-code, the router search engine 206 in communication with the dictionary engine 208 obtains names of virtual service packages based on the request. The router search engine 206 further obtains classification information (represented as class in the exemplary code) for each of the virtual service package names obtained from the dictionary engine 208. For each class of the virtual service packages, virtual service package interfaces (represented as function in the exemplary code) are obtained. The router search engine 206 sets the priority value against identification names of virtual service package interfaces pertaining to each class of the virtual service packages. Further, for each of the virtual service package interfaces obtained, a weight value is assigned against the identification names of each of the obtained virtual service package interfaces.

Based on the assigned weight value and the priority value for each of the obtained virtual service package interfaces, an execution criticality value is obtained for each of the virtual service package interfaces. Using the execution criticality value, the router search engine 206 selects the most prioritized virtual service package interface. Execution criticality is defined as a numeric value which is used to determine an interface from a given set of interfaces present across multiple virtual service packages with same interface moniker in order to diminish ambiguity while selecting a specific interface for execution. This is explained in detail in the below mentioned paragraphs of the specification.

In an embodiment of the present invention, the router search engine 206 searches the dictionary engine 208 for the most prioritized virtual service package interface for responding to the request. In this embodiment, the router search engine 206 selects the virtual service package interface with highest execution criticality as the most prioritized interface. In an exemplary embodiment of the present invention, for determining the virtual service package interface with the highest criticality, the router search engine 206 firstly generates an isomorphic graph (graph) for the virtual service package interfaces. The isomorphic graph represents various nodes which represent either single unit or multiple units of behavior of the virtual service packages. The graph is generated with representations of two different kinds of nodes viz. standard node (S-node) and virtual node (V-node). Information pertaining to each virtual service package interface is obtained from the dictionary engine 208. For each new virtual service package interface, a standard node is created with the following information "node type (S-node)", "identification name of the virtual service package interface" (also referred as function name), "class name", "virtual service package name" and "execution criticality" (which is obtained as illustrated in the exemplary code above). A virtual node is created for all virtual service package interfaces with same identification names as that of the new virtual service package interface. The created standard node is attached to the virtual node where the standard node forms the child element of the graph and the virtual node forms the sub-root element. Another standard nodes is created for all the virtual service package interfaces with same identification names as that of the new virtual service package interface with the following information "node type (S-node)", "identification name of the virtual service package interface" (also referred as function name), "class name", "virtual service package name" and "execution criticality". This standard node is then attached to the created virtual node i.e. the sub-root node. Further, for each new virtual service package interface if a virtual-node exists, then another standard node is created with the following information "node type (S-node)", "identification name of the virtual service package interface" (also referred as function name), "class name", "virtual service package name" and "execution criticality", and the standard node is attached to this virtual node. The maximum depth (i.e. height) of the isomorphic graph is either "2" or less than "2".

After creating the isomorphic graph, the router search engine 206 executes the search for the virtual service package interface with the highest execution criticality.

An exemplary pseudo-code for searching virtual service package with highest criticality is as follows:
1. START
2. Get the interface name (i.e. identification name of the virtual service package interface) to be invoked.
3. Search the interface name within isomorphic graph using standard breadth first search algorithm.
4. If no virtual-node with same interface name is found, return the interface name with all details, goto STOP
5. If any virtual-node with same interface name is found, get all standard nodes of this virtual node by standard breadth first search and create an array. Using standard bubble sort algorithm get the standard node with highest execution criticality, return the interface name with all detail, goto STOP
6. STOP The router search engine 206 determines the identification name of the virtual service package interface with the highest criticality and obtains the details of the virtual service package interface from the dictionary engine 208. The router search engine 206 then generates a service interface data including the identification name (interface name) of the determined virtual service package interface along with other details of the interface. In other words, the service interface data represents data related to the most prioritized virtual service package. The router search engine 206 transmits the service interface data to the router engine 204.

In an embodiment of the present invention, the router engine 204 receives the service interface data from the router search engine 206. The router engine 204 then invokes the virtual isomorph engine 212 to obtain the most prioritized virtual service package interface from amongst the multiple virtual service packages. The isomorph coverage engine 214 in the router engine 204 is configured to validate the invocation and cause the router engine 204 to invoke the desired virtual service package interface. The router engine 204 receives a response message after execution of desired virtual service package interface and routes it to the adapter engine 218. In an exemplary embodiment of the present invention, the response message may include an extensible markup language (XML) message. The adapter engine 218 transmits the response message to the host engine 220 which hosts the virtual service package interface for implementation in a unit testing scenario or system performance scenario. In various embodiments of the present invention, the operational store engine 216 in the router engine 204 maintains information related to service state, service type, service request and service response for a particular service virtualization activity. Further, the operational store engine 216 maintains other information such as the weight of the virtual service package interface hosted by the host engine 220, total number of transactions during the implementation process of the virtual service package interface, time taken for each of the transactions etc. for a particular service virtualization activity.

Advantageously, the virtual service package interface that is selected amongst the multiple virtual service package interfaces, in accordance with various embodiments of the present invention, need not be rewritten using a different code or need not be implemented using a different scripting mechanism if a different service virtualization tool is used as the host engine 220. No migration of virtual service package is required when the same virtual service package is required to be implemented with a different service virtualization tool. Therefore, the service virtualization system 102, in accordance with various embodiments of the present invention, provides a service virtualization tool independent framework for implementation and integration of external virtual service packages.

Figure 3:
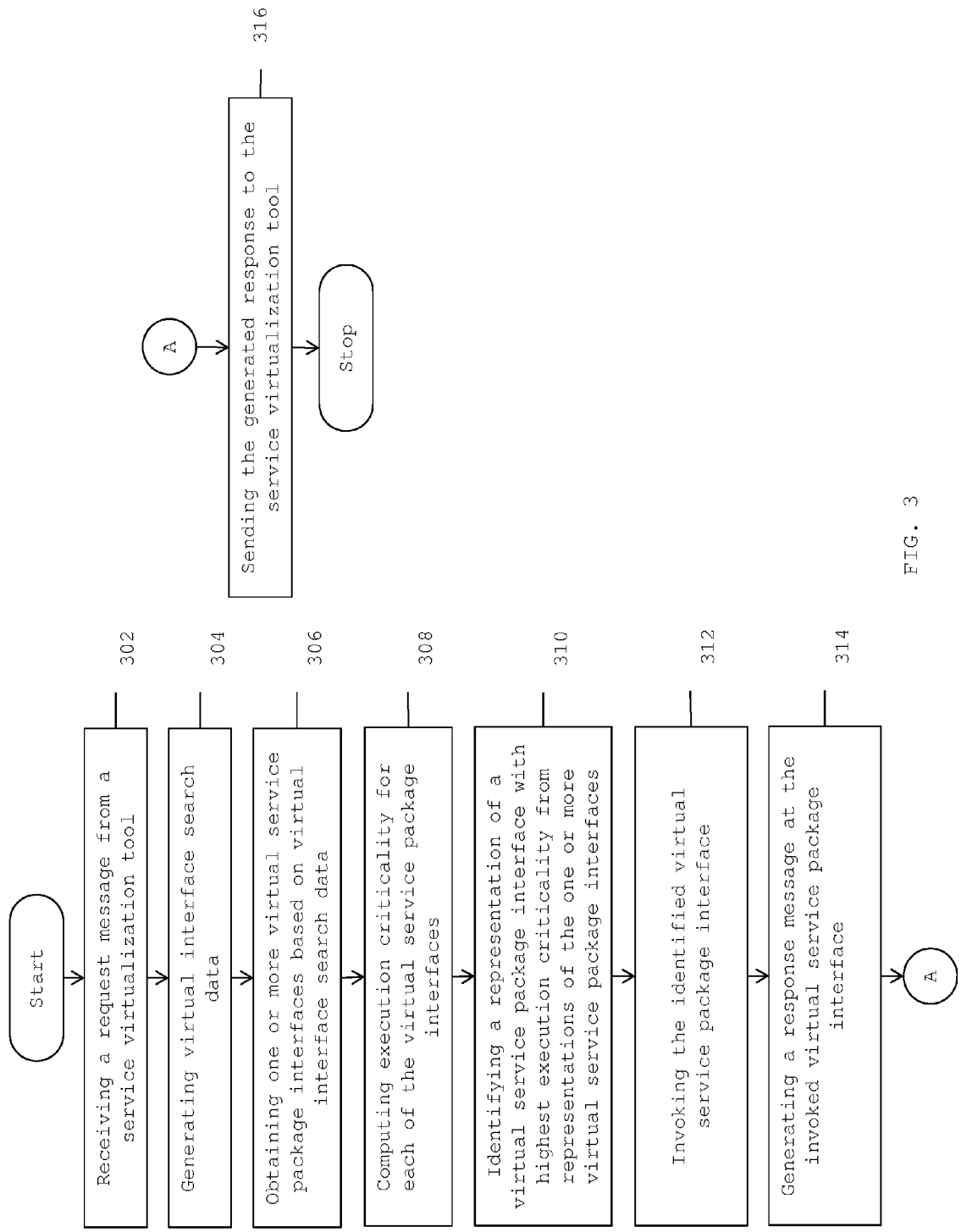
FIG. 3 illustrates a flowchart of a method for identifying, integrating and executing virtual service packages across different service virtualization tools, in accordance with an embodiment of the present invention.

FIG. 3 illustrates a flowchart of a method for identifying, integrating and executing a virtual service package across different service virtualization tools, in accordance with an embodiment of the present invention.

At step 302, a request message is received from a service virtualization tool. In an embodiment of the present invention, the request message received from the service virtualization tool includes a web service interface name and information related to a business scenario (i.e. request payload data) for invoking a virtual service package that corresponds to the requested web service. In an example, the web service interface name may correspond to external web services interfaces viz. ecommerce application web services such as ebay, financial web services such as investment banking, credit card payment and processing, insurance claim centers etc. In another exemplary embodiment of the present invention, the request may be a Transmission Control Protocol/Internet Protocol (TCP/IP)-based request for a messaging service. The business scenario may implement specific requirements for unit test scenario or a system test performance scenario for the virtual service package. The web service interface name present in the request message is for obtaining a virtual service package interface from amongst multiple virtual service package interfaces that are available in an in-memory store of a service virtualization subsystem. The service virtualization subsystem provides for a reusable framework which can be used with any standard service virtualization tool without any modifications needed in the virtual service packages during implementation of the virtual services in order to process the received request by integration of external virtual service packages.

At step 304, virtual interface search data is generated after receiving the request message. In an embodiment of the present invention, the virtual interface search data includes one or more interface parameter data and one or more configuration properties related to the interface. The one or more interface parameter data includes, but is not limited to, list of virtual service package names corresponding to the web service interface name within the request message, classification information for each of the virtual service packages, list of identification names of the virtual service package interfaces, and list of number of interfaces available for the requested virtual service package. Further, the one or more configuration properties include, in one example, one or more priority values for selecting an appropriate virtual service interface (also referred as selection priority value) from amongst multiple interfaces available in the service virtualization subsystem. In an exemplary embodiment of the present invention, priority value of a particular virtual service package interface is defined as a numeric integer value associated with the virtual service package interface which may be provided by a virtual package developer. The priority value for selection may be configured by the developer from time to time based on changing scenarios for implementing the virtual service package. In another example, the configuration properties may include one or more weight values for assigning to one or more interfaces of the requested virtual service package.

At step 306, one or more virtual service package interfaces are obtained based on the virtual interface search data. In an embodiment of the present invention, as illustrated by the exemplary pseudo-code for obtaining virtual service package interfaces based on virtual interface search data, names of virtual service packages are obtained from a dictionary engine in the service virtualization subsystem based on the request. Further, classification information (represented as class in the exemplary code) for each of the virtual service package names are obtained from the dictionary engine. For each class of the virtual service packages, virtual service package interfaces are obtained (represented as function in the exemplary code). The priority values are set against identification names of each of the virtual service package interfaces pertaining to each class of the virtual service packages. Further, for each of the virtual service package interfaces obtained, a weight value is assigned against the identification names of each of the obtained virtual service package interfaces.

At step 308, an execution criticality value is computed for each of the virtual service package interfaces. In an embodiment of the present invention, as illustrated in the exemplary pseudo-code for obtaining virtual service package interfaces, an execution criticality value is computed for each of the virtual service package interfaces based on the assigned weight value and the priority value for each of the obtained virtual service package interfaces.

Figure 3A:
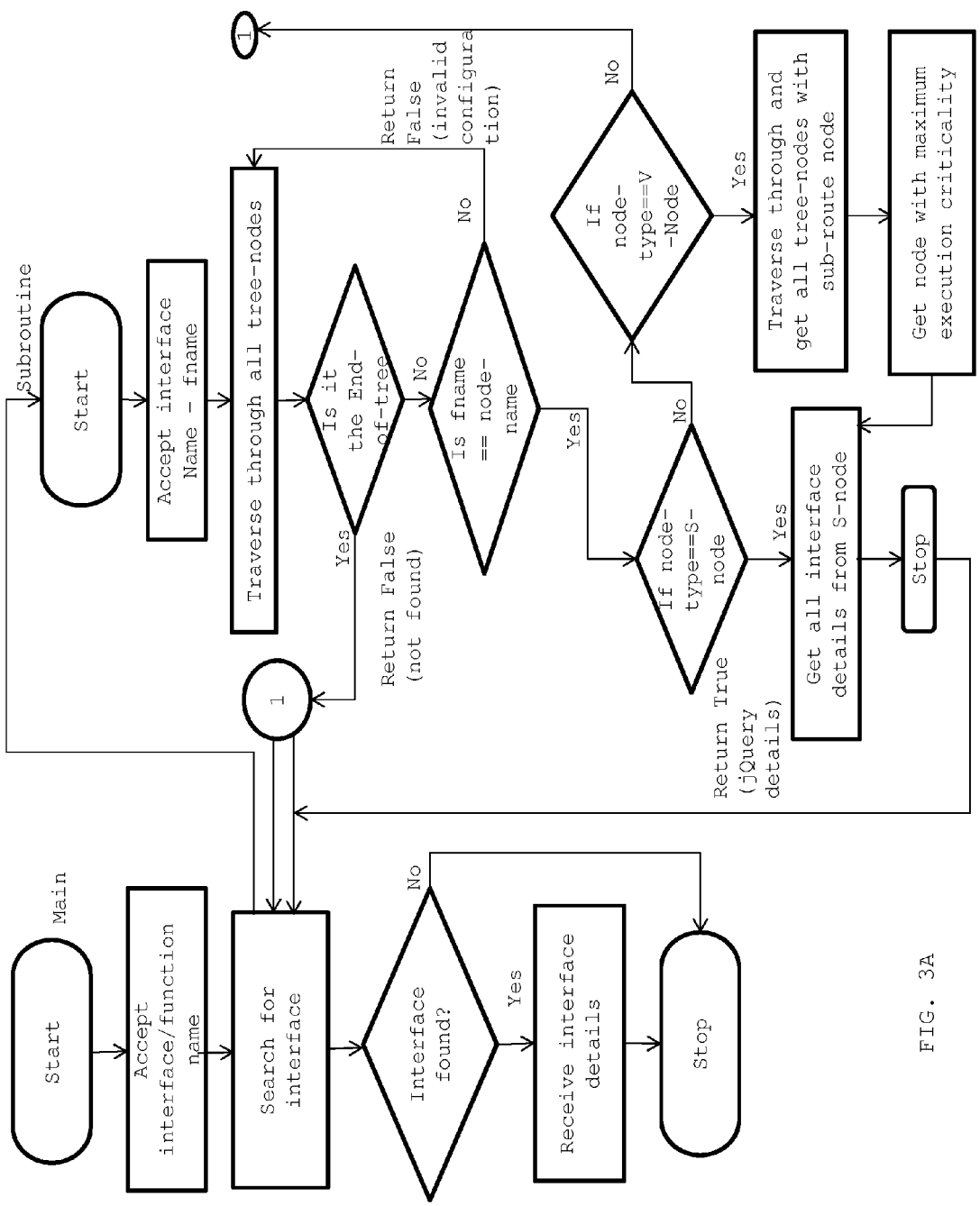
FIG. 3A illustrates a flowchart for determining a virtual service package interface node with highest execution criticality using an isomorphic graph representation mechanism.

At step 310, a representation of a virtual service package interface with the highest execution criticality is identified from representations of the one or more virtual service package interface representations. In an exemplary embodiment of the present invention, for determining the virtual service package interface with the highest execution criticality, an isomorphic graph (graph) is generated for the virtual service package interfaces. The isomorphic graph represents various nodes which represent either single unit or multiple units of behavior of the virtual service packages. The graph is generated with representations of two different kinds of nodes viz. standard node (S-node) and virtual node (V-node). Information pertaining to each virtual service package interface is obtained from the dictionary engine. For each new virtual service package interface, a standard node is created with the following information "node type (S-node)", "identification name of the virtual service package interface" (also referred as function name), "class name", "virtual service package name" and "execution criticality" (which is obtained as illustrated in the exemplary code above). A virtual node is created for all virtual service package interfaces with same identification names as that of the new virtual service package interface. The created standard node is attached to the virtual node where the standard node forms the child element of the graph and the virtual node forms the sub-root element. Another standard node is created for all the virtual service package interfaces with same identification names as that of the new virtual service package interface with the following information "node type (S-node)", "identification name of the virtual service package interface" (also referred as function name), "class name", "virtual service package name" and "execution criticality". This standard node is then attached to the created virtual node i.e. the sub-root node. Further, for each new virtual service package interface, if a virtual-node exists then another standard node is created with the following information "node type (S-node)", "identification name of the virtual service package interface" (also referred as function name), "class name", "virtual service package name" and "execution criticality", and the standard node is attached to this virtual node. The maximum depth (i.e. height) of the isomorphic graph is either "2" or less than "2". FIG. 3A represents a flowchart illustrating a method for determining a virtual service package interface node with highest execution criticality using an isomorphic graph representation mechanism, in accordance with various embodiments of the present invention. After creating the isomorphic graph, the virtual service package interface with the highest execution criticality is searched. The exemplary pseudo-code for searching virtual service package interface with highest criticality is illustrated as follows.

1. START
2. Get the interface name (i.e. Identification name of the virtual service package interface) to be invoked.
3. Search the interface name within isomorphic graph using standard breadth first search algorithm.
4. If no virtual-node with same interface name is found, return the interface name with all details, goto STOP
5. If any virtual-node with same interface name is found, get all standard nodes of this virtual node by standard breadth first search and create an array. Using standard bubble sort algorithm get the standard node with highest execution criticality, return the interface name with all detail, goto STOP
6. STOP The virtual service package interface with the highest execution criticality value represents the most prioritized virtual service package interface to be executed in a given business scenario.

At step 312, a virtual service package interface that corresponds to the representation of the virtual service package interface is invoked. In an embodiment of the present invention, identification name of the virtual service package interface with the highest criticality and other details of the virtual service package interface are obtained from the dictionary engine in the service virtualization subsystem. The virtual service package interface with the highest criticality is the most prioritized virtual service package interface for responding to the request received from the service virtualization tool. A service interface data including the identification name of the virtual service package interface with the highest execution criticality along with other details of the interface is generated. Using the service interface data, the most prioritized virtual service package interface in the virtual isomorph engine is invoked.

At step 314, a response message is generated after invoking the virtual service package interface. In an embodiment of the present invention, the response message includes details that are generated based on execution of the invoked virtual service package interface.

At step 316, the response message generated at the invoked virtual service package interface is sent to the service virtualization tool. In various embodiments of the present invention, the response message is sent to the service virtualization tool so as to be processed by virtual services at the service virtualization tool and sent to back to querying clients.

Figure 4:
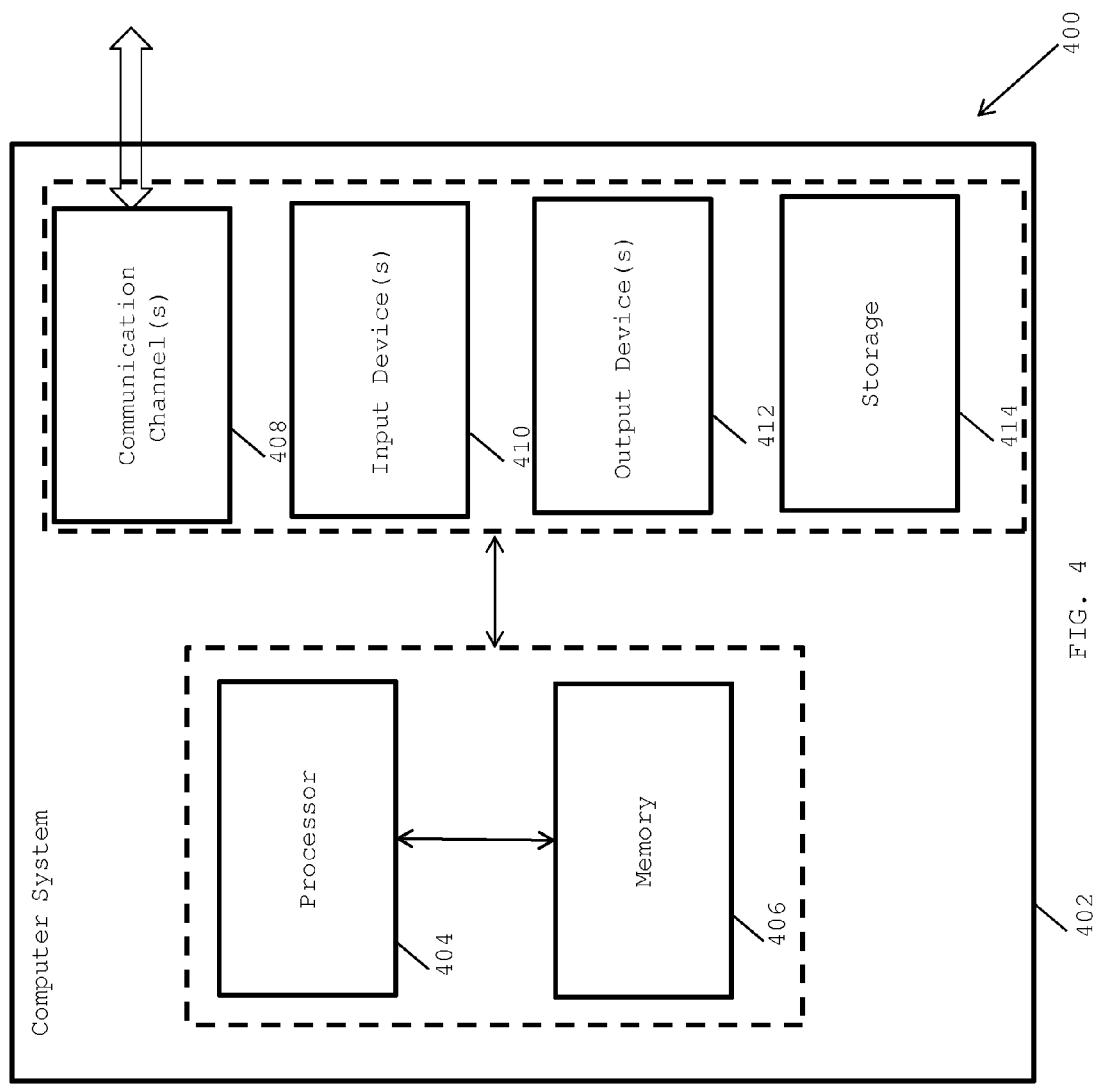
FIG. 4 illustrates an exemplary computer system in which various embodiments of the present invention may be implemented.

FIG. 4, illustrates an exemplary computer system in which various embodiments of the present invention may be implemented.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

In an embodiment of the present invention, the computer system 402 is part of a distributed network where various embodiments of the present invention are implemented for rapidly developing end-to-end software applications.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the disclosure.

We claim:

1. A computer-implemented method for integrating and implementing virtual service packages across different service virtualization tools via program instructions stored in a memory and executed by a processor, the method comprising:
generating, via the processor, data for performing a search on multiple virtual service package interfaces based on a request from a service virtualization tool, the multiple virtual service package interfaces corresponding to multiple virtual service packages;
fetching, via the processor, one or more virtual service package interfaces based on the search performed on the multiple virtual service package interfaces using the generated data, wherein each of the fetched virtual service package interface is assigned a selection priority value and a weight value;
computing, via the processor, an execution criticality value for each of the fetched virtual service package interfaces based on the selection priority value and the weight value assigned to each of the fetched virtual service package interfaces;
selecting, via the processor, a virtual service package interface with a highest execution criticality value;
invoking, via the processor, the selected virtual service package interface for executing the selected virtual service package interface; and
sending, via the processor, a response generated based on execution of the selected virtual service package interface to the service virtualization tool, wherein the selected virtual service package interface is integratable and implementable across different service virtualization tools.

2. The computer-implemented method of claim 1, wherein the virtual service packages emulate behavior of corresponding external application services during testing or an application development operation.

3. The computer-implemented method of claim 1, wherein the request is analyzed to obtain details pertaining to an external web service interface and information related to a business requirement for executing the virtual service package corresponding to the requested web service interface.

4. The computer-implemented method of claim 3, wherein the generated data comprises virtual service package names related to the requested web service interface, classification information for each of the virtual service packages, identification names of virtual service package interfaces corresponding to the virtual service packages and number of virtual service package interfaces available for each of the virtual service packages.

5. The computer-implemented method of claim 4, wherein fetching the one or more virtual service package interfaces based on the generated data further comprises:
fetching one or more virtual service package interfaces for each class of the virtual service packages that correspond to the requested web service.

6. The computer-implemented method of claim 5, wherein the selection priority value and the weight value is assigned against the identification names of each of the fetched virtual service package interfaces in each class of the virtual service package.

7. The computer-implemented method of claim 1, wherein the execution criticality value is a numeric value computed using the following formulae: $EC(k)=wt(k)*sp(j)$, where EC represents execution criticality for each virtual service package interface, wt represents weight value, sp represents selection priority value, k represents virtual service package interface for each class j of the virtual service package.

8. The computer-implemented method of claim 1, wherein selecting the virtual service package interface with the highest execution criticality value comprises:
creating an isomorphic graph with one or more nodes representing each of the fetched virtual service package interfaces, wherein the computed execution criticality is represented against each of the node representations of each of the virtual service package interfaces;
searching the fetched virtual service package interfaces using the isomorphic graph based on identification names of the virtual service package interfaces obtained based on the generated data;
rendering details of all the nodes representing the virtual service package interfaces that correspond to the identification names; and
identifying the node with the highest execution criticality from the rendered nodes, wherein the node with the highest criticality is representative of the most prioritized virtual service package interface for responding to the request message.

9. The computer-implemented method of claim 1, wherein invoking the selected virtual service package interface further comprises:
validating if the invoked virtual service package corresponds to the selected virtual service package interface; and
routing the request to the selected virtual service package interface if it is found that the selected virtual service package interface is not invoked.

10. The computer-implemented method of claim 1, wherein sending a response generated based on execution of the selected virtual service package interface to the service virtualization tool comprises:
generating a response message that includes details obtained based on execution of the invoked virtual service package interface; and
sending the response message to the service virtualization tool for integration and implementation of the selected virtual service package interface.

11. A system for integrating and implementing virtual service packages across different service virtualization tools, the system comprising:
- a virtual isomorph engine in communication with a hardware processor of the system and configured to host multiple virtual service package interfaces;
- a router search engine stored in a memory in communication with the processor and configured to:
  - generate data for performing a search on multiple virtual service package 25 interfaces based on a request received from a service virtualization tool, the multiple virtual service package interfaces corresponding to multiple external virtual service packages;
  - fetch one or more virtual service package interfaces based on the search performed on the multiple virtual service package interfaces using the generated data, and further wherein each of the fetched virtual service package interfaces is assigned a selection priority value and a weight value;
  - compute an execution criticality value for each of the fetched virtual service package interfaces based on the selection priority value and the weight value assigned to each of the fetched virtual service package interfaces;
  - select a virtual service package interface with highest execution criticality value;
  - invoke the selected virtual service package interface stored in the virtual isomorph engine for executing the selected virtual service package interface; and
  - send a response generated based on execution of the selected virtual service package interface to the service virtualization tool, wherein the selected virtual service package interface is integratable and implementable across different service virtualization tools.

12. The system of claim 11 further comprising a dictionary engine configured to maintain a list of virtual service package names, classification information for each of the virtual service packages, list of identification names of virtual service package interfaces corresponding to the virtual service packages and list of number of virtual service package interfaces available for each of the virtual service packages.

13. The system of claim 12 further comprising a dictionary validation engine in communication with the processor and configured to validate information related to the virtual service package interfaces stored in the dictionary engine against the virtual service package interfaces stored in the virtual isomorph engine.

14. The system of claim 11, wherein the router search engine is configured to:
- analyze the request to obtain details pertaining to an external web service and information related to a business requirement for implementing the virtual service package corresponding to the requested web service; and
- generate, in communication with the dictionary engine, data associated with the virtual service package interfaces that correspond to the virtual service package.

15. The service virtualization subsystem of claim 11 further comprising an isomorph-coverage engine in communication with the processor and configured to:
- maintain data structures corresponding to each of the virtual service package interfaces stored in the virtual isomorph engine; and
- update the data structures corresponding to each of the virtual service package interfaces by communicating with real application services that correspond to each of the virtual service package interfaces.

16. The system of claim 15, wherein the isomorph coverage engine is configured to assign identification names to each of the virtual service package interfaces.

17. The system of claim 11 further comprising a router engine in communication with the processor and configured to route the request received from the service virtualization tool to the router search engine.

18. The system of claim 17, wherein the isomorph coverage engine is configured to invoke the router engine to route the request to the selected virtual service package interface if it is found that the invoked virtual service package interface does not correspond to the selected virtual service package interface.

19. The system of claim 11, wherein the router search engine is configured to:
- generate a response message that includes details obtained based on execution of the invoked virtual service package interface; and
- send the response message to the service virtualization tool for integration and implementation of the selected virtual service package interface.

20. A computer program product comprising:
- a non-transitory computer-readable medium having computer-readable program code stored thereon, the computer-readable program code comprising instructions that, when executed by a processor, cause the processor to:
- generate data for performing a search on multiple virtual service package interfaces based on a request received from a service virtualization tool, the multiple virtual service package interfaces corresponding to multiple external virtual service packages;
- fetch one or more virtual service package interfaces based on the search performed on the multiple virtual service package interfaces using the generated data, and further wherein each of the fetched virtual service package interface is assigned a selection priority value and a weight value;
- compute an execution criticality value for each of the fetched virtual service package interfaces based on the selection priority criteria and the weight value assigned to each of the fetched virtual service package interfaces;
- select a virtual service package interface with highest execution criticality value;
- invoke the selected virtual service package interface for executing the selected virtual service package interface; and
- send a response generated based on execution of the selected virtual service package interface to the service virtualization tool, wherein the selected virtual service package interface is integratable and implementable across different service virtualization tools.

* * * * *